United States Patent [19]

Wellbrock

[11] 3,769,465

[45] Oct. 30, 1973

[54] ELECTRONIC SERVO IN MAGNETIC RECORDING READOUT

[75] Inventor: Anton G. Wellbrock, Yorktown Heights, N.Y.

[73] Assignee: International Business Machines Corporation, Armonk, N.Y.

[22] Filed: Dec. 20, 1971

[21] Appl. No.: 209,987

Related U.S. Application Data

[63] Continuation of Ser. No. 850,860, Aug. 18, 1969, abandoned.

[52] U.S. Cl.179/100.2 MD, 179/100.2 S, 340/174.1 C

[51] Int. Cl. ...................... G11b 19/14, G11b 21/08

[58] Field of Search .......... 179/100.2 K, 100.2 MD, 179/100.2 S; 340/174.1 C, 174.1 D, 174.1 B, 174.1 H; 178/6.6 DC

[56] References Cited

UNITED STATES PATENTS

| | | | |
|---|---|---|---|
| 3,292,168 | 12/1966 | Gray | 340/174.1 C |
| 3,229,273 | 1/1966 | Baaba | 340/174.1 M |
| 3,263,031 | 7/1966 | Welsh | 179/100.2 MD |
| 3,126,535 | 3/1964 | Streeter | 340/174.1 C |
| 3,453,612 | 7/1969 | Poumakis | 340/174.1 C |

*Primary Examiner*—Terrell W. Fears
*Assistant Examiner*—Alfred H. Eddleman
*Attorney*—Homer L. Knearl

[57] ABSTRACT

In high-density recording, a slight lateral movement between an information track and a readout transducer will cause either a failure to read out information from the track or incorrect read out of information. Instead of moving a transducer to a position centered over the track, a plurality of transducers are in a fixed position, and electronic gating is used to select the transducer presently centered over the track to be readout. Transducers used herein are the conventional magnetic heads or the newer magneto-optic transducers which utilize photodiodes as a final sense element. The alignment between tracks and transducers is detected by a plurality of transducers which monitor a guard band on the magnetic recording surface. The transducers monitoring the guard band detect the lateral edge of recorded information. The tracks on the magnetic surface will be a fixed position relative to this lateral edge. The detection of the lateral edge then permits the selection of the transducers which will be centered over each track on the magnetic recording surface.

18 Claims, 5 Drawing Figures

INVENTOR
ANTON G. WELLBROCK
BY Homer L. Knearl
ATTORNEY

ELECTRONIC SERVO IN MAGNETIC RECORDING READOUT

CROSS REFERENCE TO RELATED APPLICATION

This application is a continuation of copending commonly assigned application Ser. No. 850,860, filed Aug. 18, 1969. The parent application is now abandoned.

BACKGROUND OF THE INVENTION

This invention relates to a new method and apparatus for servoing transducers relative to tracks of magnetic information on a recording surface. More particularly, the servoing is accomplished by electronically selecting the transducer which is presently centered on the tracks of information being read out.

In the past, the servoing of magnetic heads relative to magnetic tracks, so as to keep the two in alignment, has been accomplished by a mechanical movement of the magnetic head. As the information tracks on the magnetic surface moved laterally with respect to the heads, this lateral movement was sensed. In response to the sensed movement, a mechanical drive moved the magnetic transducer in the same lateral direction to keep the transducer centered on the track.

For high-density recording, this operation is not accurate nor fast enough to keep the magnetic transducer centered on the information tracks. In highdensity recording, the tracks may be only a few thousandths of an inch across. Mechanical movement of the head to follow a track with an accuracy of a few thousandths of an inch is difficult to achieve. Furthermore, mechanical movement of the head is not rapid enough to follow the rapid lateral movement of a short width track. Because the track is so small, even a slight lateral movement of magnetic tape will rapidly misalign the track and the transducer.

It is a paramount object of this invention to provide a servoing system which will maintain alignment between transducers and information tracks even where the tracks have a very small width.

It is a further object of this invention to maintain the alignment between a transducer and a track by positioning a plurality of transducers over a track and electronically selecting the transducer, or transducers, which are centered on a track at a given time.

SUMMARY OF THE INVENTION

In accordance with this invention, the above objects are accomplished by fixedly positioning a plurality of transducers across the tracks on a recording surface. The pattern of voltages produced by the transducers is monitored to detect the cooperation between transducers and tracks and thereby to decode the data in the tracks. One group of transducers monitors a guard band or guide track on the magnetic recording surface to detect the lateral position of the information or data tracks relative to the magnetic transducers. The remaining tracks are electronically selected in accordance with the position information detected by the first group of transducers whereby each information track is read out by one or more transducers presently aligned with each information track.

The great advantage of this invention lies in the fact that the servoing operation is electronic, and there are no moving mechanical parts. Accordingly, the selection of a transducer, which is centered on an information track, is very fast and responsive to rapid lateral movements of the recording surface. Also, the selection of a transducer is at a much more rapid speed than the frequency of information passing under the transducers. Accordingly, no information will be lost because of incorrect alignment between transducer and track. Another advantage of the invention is that the tracks may be more closely packed without adversely affecting a servo operation to keep a magnetic transducer centered on a track.

The foregoing and other objects, features and advantages of the invention will be apparent from the following more particular description of preferred embodiments of the invention, as illustrated in the accompanying drawings. BRIEF DESCRIPTION OF DRAWINGS FIG. 1 shows a plurality of magnetic heads with three heads per track for reading out information on a moving magnetic tape.

Figure 4:
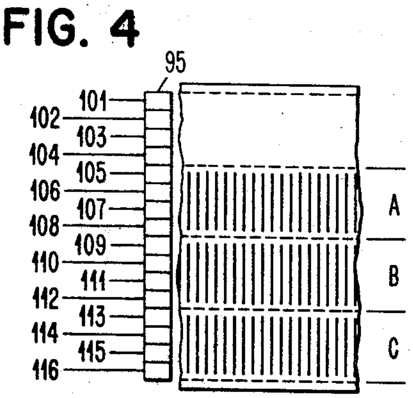
FIG. 4 shows the relationship between the tracks on the magnetic tape and the linear array of photo-diodes.
Figure 5:
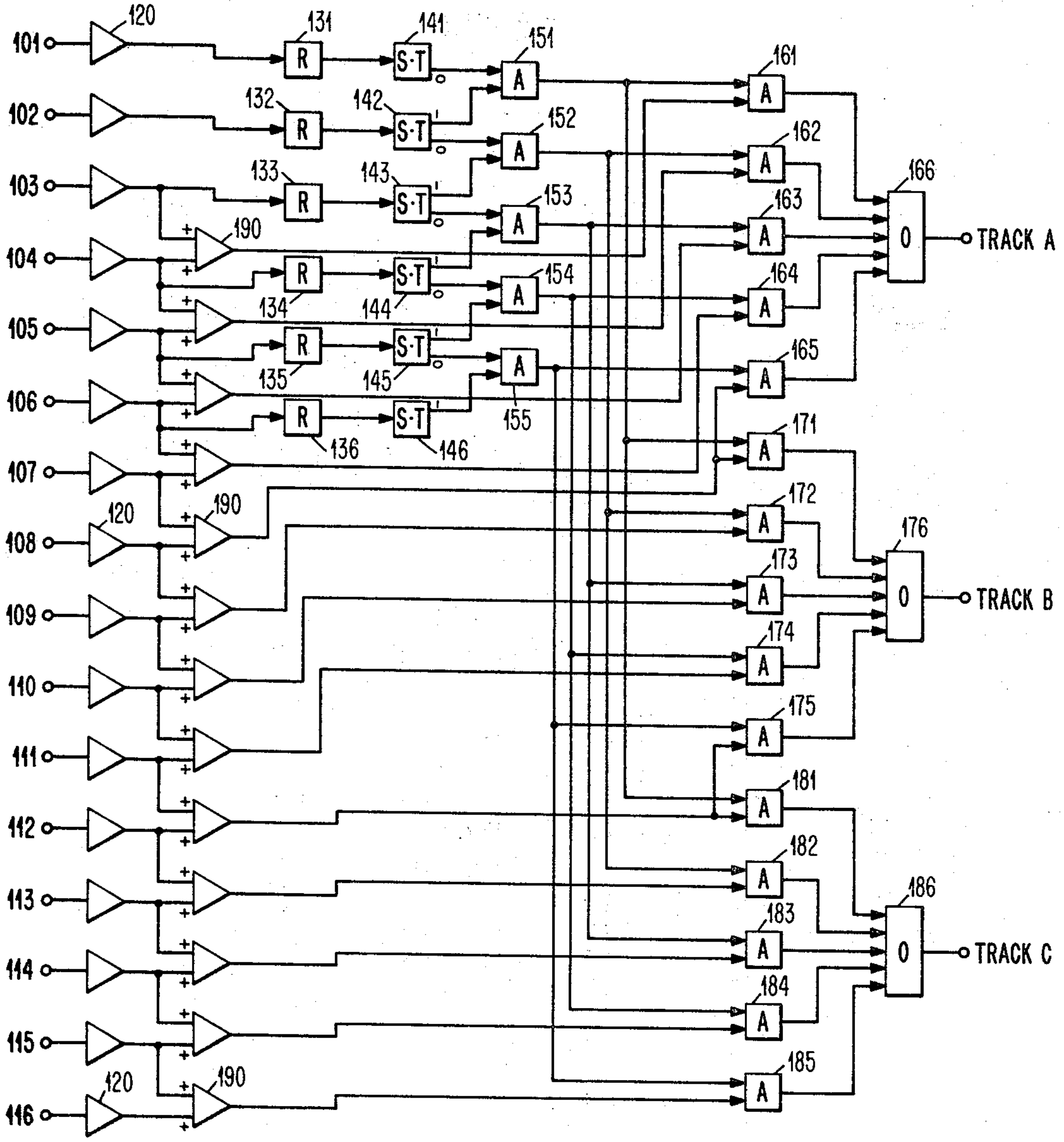

FIG. 5 shows electronic servo apparatus for operating with the photodiodes of FIGS. 4 and 5 whereby the outputs of each pair of photodiodes centered on each track are summed and gated out as the total out-put from that track. DETAILED DESCRIPTION Referring now to FIG. 1, a plurality of magnetic readout heads are shown positioned over a strip of magnetic tape having three tracks recorded thereon. In addition, a guard-band area is shown at the near edge of the tape. Even though only three tracks, A, B, and C, are shown, there could be ten tracks, 100 tracks, or 1,000 tracks, or any number of tracks.

Figure 1:
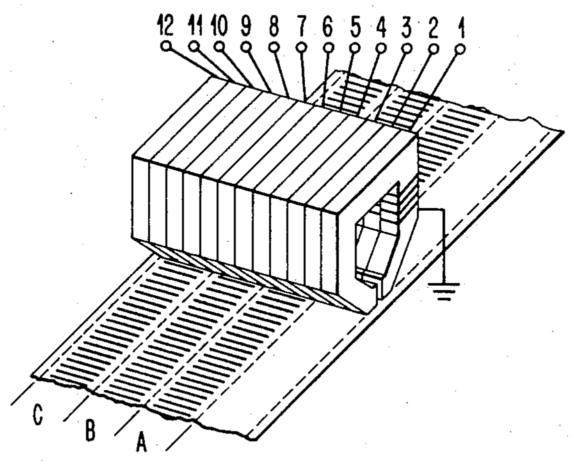
Figure 2:
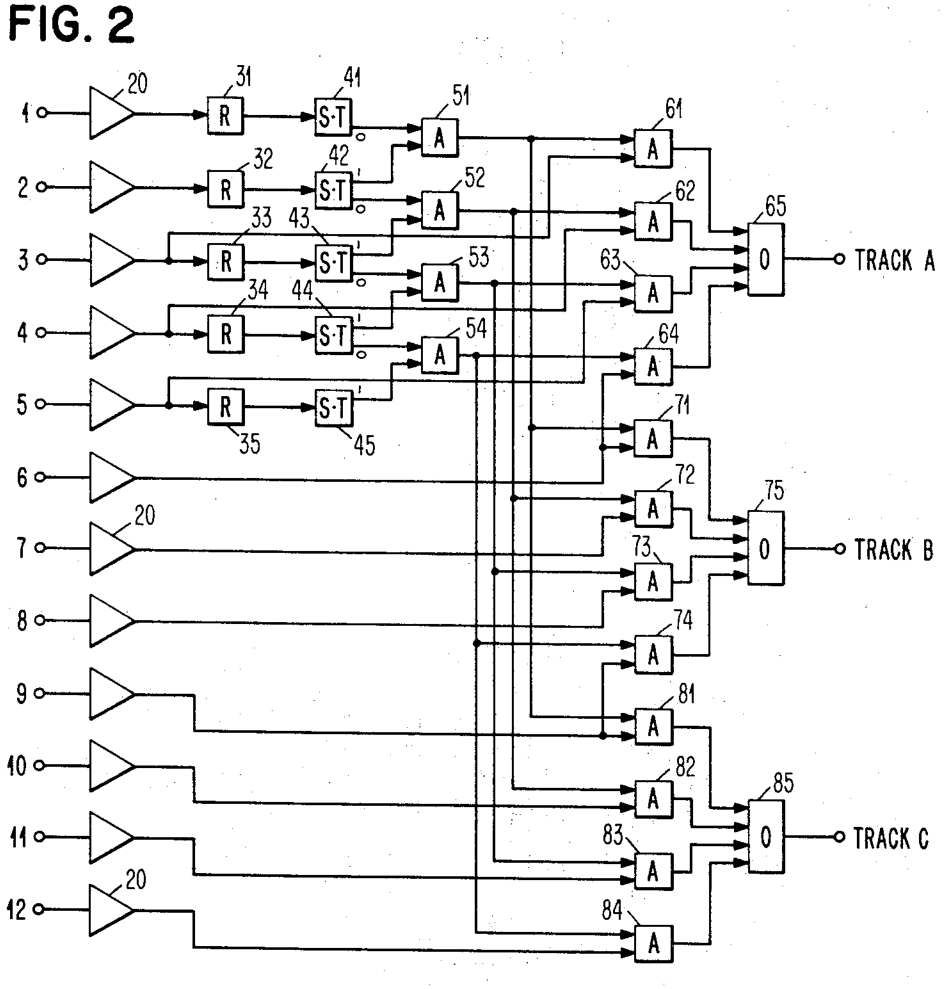
FIG. 2 shows the electronic servo operation connected to the magnetic heads of FIG. 1 and operating to select the single head centered on each information track.

As shown in FIG. 1, the width of the magnetic heads is such that three magnetic heads spaced immediately adjacent each other, have the same width as a single track of information. The magnetic heads have been assigned reference numerals 1 through 12. These same reference numerals are indicated in FIG. 2. A magnetic head of given reference numeral supplies its signal over the line given the same reference numeral in FIG. 2.

In FIG. 2, the signal lines from the magnetic read heads 1 through 12 are each applied to a separate sense amplifier. The sense amplifiers are arranged in a column in FIG. 2 and generally indicated by the reference numeral 20. The top five sense lines are amplified and applied to rectifiers identified by reference numerals in the 30 series.

The signal being rectified is the data signal. The data signal may be encoded so that the recorded signal is fundamentally an alternating current signal. This AC signal, when rectified, will produce a voltage level other than ground. If the guard band is blank, there is no AC signal to be rectified, and the output of the rectifier is zero volts or ground.

Of course, the rectifiers could be replaced by frequency sensitive or phase sensitive detectors. Also, as is well known, a guide track and a data track might be superimposed as shown in commonly assigned U. S. Pat. No. 3,458,785, entitled "Fine and Coarse Motor Positioning Control For a Magnetic Disc Memory." In a frequency sensitive embodiment, the data tracks would be recorded with a given carrier frequency, and the guard band or guide track with a different frequency. The frequency sensitive detector would have one voltage output for data frequency and another for guard-band frequency.

In a phase sensitive embodiment, there would be a predetermined phase relationship between the signal recorded on the information or data track and the guide track signal. The phase sensitive detectors would have one voltage output when detecting the informaiton signal and another voltage output when detecting the guardband or guide track signal.

Either frequency sensitive detectors, or phase sensitive detectors, could be substituted for the rectifiers of FIG. 2. In any case, the output voltages of the rectifiers or detectors would be applied to Schmitt triggers.

The Schmitt triggers are shown in the center of FIG. 2 and are identified by numerals in the 40 sequence. The Schmitt triggers have two important functions. First, they act as a voltage level detector, and, second, they provide a dead-band region for the servo operation. When the output of the rectifier exceeds a predetermined voltage, the Schmitt trigger is switched into one bi-stable state defined as representing the numeral 1. As the voltage applied to the input of the Schmitt trigger decreases below a second predetermined voltage level, the Schmitt trigger returns to a second binary state defined as 0. The 1 and 0 outputs of the Schmitt triggers are applied to AND gates in the 50 series.

AND gates in the 50 series are utilized to logically decide the position of the edge between track A and the guard band. Each of the AND gates in the 50 series will only have an output if both of its inputs are up. This condition corresponds to one transducer seeing no signal, i.e., guard band, and its adjacent transducer seeing track A.

The one AND gate of the 50 series that does have an output will enable other AND gates. These latter AND gates pass the signals from the transducers centered on the information tracks. A collecting OR gate is designated as the output terminal for a given track. For example, AND gates in the 60 series will be enabled one at a time by the output from one of the AND gates in the 50 series. The AND gates in the 60 series act to monitor transducers 3, 4, 5, and 6. One of these transducers will be centered on track A. The AND gate in the 60 series, which is enabled, will be connected to the transducer centered on Track A. OR gate 65 serves as the collecting point for signals from AND gates in the 60 series.

AND gates in the 70 series operate in the same manner as those in the 60 series. Their collecting point is the OR gate 75 whose output is the output for track B. Similarly, AND gates in the 80 series are gated in the same manner as those for the 60 and 70 series. Their collecting point is the OR gate 85 whose output is the track C output.

In operation of FIG. 2, if the edge between the guard band and track A lies between transducers 3 and 4, rectifier 33 will have zero or a low voltage output, while rectifier 34 will have a higher voltage output. Schmitt trigger 43 will then be in the 0 state, and the Schmitt trigger 44 will be in the 1 state. These conditions will combine to enable AND gate 53 which will have an output.

AND gates 51, 52, and 54 will not have an output, because Schmitt triggers 41 and 42 will be in 0 state, and Schmitt trigger 45 will be in the 1 state. These conditions will combine, as for example, at AND gate 54, to provide an up input on one terminal of the AND gate and a down input on the other terminal of the AND gate. The AND gate will therefore have no output.

The output from AND gate 53 enables AND gates 63, 73, and 83. These AND gates will pass the transducer signal from transducers 5, 8, and 11. These transducers will be centered on tracks A, B, and C, respectively, when the edge between the guard band and track A lies between transducers 3 and 4.

If the magnetic tape were to shift laterally so that the edge between track A and the guard band fell between transducers 2 and 3, then AND gate 52 would be enabled. The output from AND gate 52 would enable AND gates 62, 72, and 82. This effectively shifts the transducers being monitored to transducers 4, 7, and 10. Accordingly, the shifting of the tape in a lateral manner will cause a shifting of the selection of the transducer reading out each track so that the transducer reading a given track will always be centered on the track.

As shown in FIG. 2, up to four different lateral positions of the tape can be accepted. However, of course, more logical hardware operating in the same manner could be utilized to monitor more of the transducers so that a larger lateral movement of the tape could also be detected.

The above examples of operation assumed that the edge between guard band and track A fell between two transducers. Of course, it is likely that this edge will not fall exactly between two transducers, but will in fact lie partially on one transducer. This situation might cause a jittering in the servo operation, but for the existence of a dead band. As pointed out previously, the dead band is created by use of a Schmitt trigger as the voltage level detector monitoring each rectifier.

The dead band is created by the operating characteristic of the Schmitt trigger. The trigger is set on by one voltage level and does not reset until the voltage level falls below a second level. This second voltage level is lower than the first voltage level. Accordingly, the voltage difference between the set and reset voltage levels effectively sets up a dead-band region. As an example, the Schmitt trigger voltages could be set so that the Schmitt trigger would not set until a transducer was 75 percent covered by track A. And the trigger would not reset until less than 30 percent of a transducer was covered by track A. Of course, any threshold voltage levels could be built into the Schmitt trigger to change the levels and range of the dead band as desired. The important fact is that a dead band should be used to prevent the servo operation from jittering due to the edge of the guard band in track A lying exactly on a threshold selection point for a given transducer.

Figure 3:
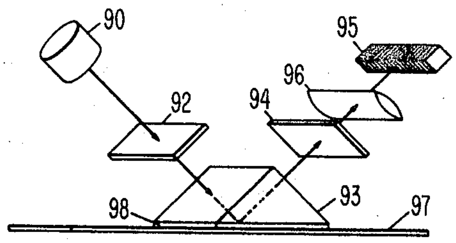
FIG. 3 shows a magneto-optic transducer where the sensing element is a linear array of photo-diodes.

Referring now to FIG. 3, magneto-optic transducing hardware is shown. The invention is particularly useful in the magneto-optic environment. The magneto-optic transducer hardward works on very high density recordings in the order of 1,000 tracks per inch. Light sensitive diodes, because of their size and the fact that they lend themselves to integrated circuit manufacture, can be positioned extremely close together. Accordingly, many diodes could be positioned in parallel over a given track of information.

In FIG. 3, light source 90 produces parallel beams, which are polarized by polarizer 92 before they impinge on the prism 93. The light beams enter the prism 93 and strike the bottom of the prism. A magnetic thin film 98 is plated on the bottom of the prism. Light then reflects from the bottom of the prism and passes out through the right side of the prism to the analyzer 94 and is focused onto a linear array of diodes 95 by lens 96.

In operation, the magnetic tape 97 is positioned adjacent the magnetic thin film 98. A transfer of magnetic information takes place between the tape 97 and film 98. The light then striking the interface between the prism 93 and the film 98 is subjected to the Kerr effect which results in rotation of the light's plane of polarization. The direction of rotation depends upon the direction of magnetization of the thin film. As the reflected light passes out through analyzer 94, it will appear dark or bright, depending upon the direction of rotation caused by the magnetization of the thin film 98. The light, no-light condition is focused by lens 96 onto the array of light sensitive diodes so that the information read from the magnetic thin film 98 may be converted into an electrical signal.

In FIG. 4, the relationship between the diode array 95 and the tracks on a tape are shown. Of course, in normal operation, the tape would be much wider, and more diodes would be used. As shown in FIG. 4, there are three tracks of information, plus a guard band. The width of a diode is one-quarter the width of a track. These dimensions are not critical. It is only important that there be one diode or transducer on each side of the transducer being used to read out information from a given track. Accordingly, the embodiment previously described in FIG. 2 is the minimum preferred number of transducers per track, i.e., three transducers per track.

In FIG. 5 a second preferred embodiment of the invention utilizes four transducers per track. These transducers could be the light diodes of FIG. 3 positioned relative to the tracks in the tape as shown on FIG. 4. Alternatively, magnetic heads, such as those shown in FIG. 1, could be used if they were spaced so that there were four magnetic heads per track.

In FIG. 5, the lines 101 through 116 correspond to the signal lines from the photo diodes 101 through 116 depicted in FIG. 4 and shown schematically as diode array 95 in FIG. 3.

The operation of the two embodiments, shown in FIGS. 2 and 5, is substantially the same. Rectifiers in the 130 series, Schmitt triggers in the 140 series, and AND gates in the 150 series in FIG. 5 operate in exactly the same manner as the rectifiers in the 30 series, Schmitt triggers in the 40 series, and AND gates in the 50 series, previously shown and described with reference to FIG. 2. Similarly, the track-gating logic in the 160 series feeding into collecting OR gate 166 operates in the same manner as the track-gating logic in the 60 series shown in FIG. 2. This also holds true for the track-gating logic in the 170 series and the 180 series of FIG. 5 with regard to the same trackgating logic in the 70 and 80 series in FIG. 2.

The significant difference between the embodiments in FIG. 2 and FIG. 5 is the addition of the summing amplifiers generally identified by the reference numeral 190. The function of these summing amplifiers is to combine the outputs from two adjacent transducers to produce a summed signal, which is, of course, larger than the output of any given transducer. To be effective, the two transducers which are summed must be reading the same track of information. The servoing operation performed by the rectifiers, Schmitt triggers and AND gates acts to select the output from the summing amplifier whose two transducers are centered on a given track of information.

In operation, if the edge between track A and the guard band lies between light sensitive diodes 104 and 105, rectifier 134 will have a low voltage output, while rectifier 135 will have a high voltage output. Schmitt trigger 144 is driven to the 0 state, and Schmitt trigger 145 is driven to the 1 state. These conditions on Schmitt triggers 144 and 145 will enable AND gate 154. All other AND gates in the 150 series will have no output as one of their inputs will be up while the other is down.

The output from AND gate 154 then selectively enables the appropriate AND gates to pass the summed signal from transducers centered over the appropriate tracks. For example, the output from AND gate 154 enables AND gate 164, which then passes the summed output from diodes 106 and 107. This summed output is collected by OR gate 166 and passed out as the output from track A. In FIG. 5 it can be seen that if the edge of track A lies between diodes 104 and 105, then diodes 106 and 107 will be centered on track A.

The output from AND gate 154 also enables AND gate 174 to pass the summed output from diodes 110 and 111. Likewise, the output from AND gate 154 enables AND gate 184 to pass the summed output from diodes 114 and 115. As can be seen in FIG. 4, light diodes 110 and 111 are centered on track B while light diodes 114 and 115 are centered on track C.

If the tape were to laterally shift in position under the diodes to position where the edge between track A and the guard band was positioned between transducer 103 and 104, then AND gate 153 would be the only AND gate in the 150 series having an output. The output from AND gate 153 would enable AND gates 163, 173, and 183. These AND gates would pass the summation of diodes 105 and 106, 109 and 110, and 112 and 113, respectively, as the outputs for tracks A, B, and C. Diodes 105 and 106 would be centered on track A, if such a lateral position shift took place. Similarly, light sensitive diodes 109 and 110 and 113 and 114 would be centered respectively on tracks B and C.

Other alternative configurations of the invention will be apparent to one skilled in the art. For example, if there were more transducers per track, then more transducers could be summed to build up the output from that track. Also, more transducers could be monitored by rectifiers and Schmitt triggers to increase the invention's ability to servo over a larger, lateral movement of the tape. Also, alternative logic might be used to determine the edge position of track A, and thereafter select the transducers centered on the information tracks.

While the invention has been particularly shown and described with reference to preferred embodiments thereof, it will be understood by those skilled in the art that various changes in form and details may be made therein without departing from the spirit and scope of the invention.

What is claimed is:

1. Apparatus for selecting transducers aligned with information tracks on the surface of a magnetic storage medium, wherein each track is positioned a constant distance from a guard band parallel to the tracks on the storage medium, comprising:

a plurality of magnetic transducers fixedly mounted adjacent the storage medium, each transducer being magnetically coupled with a portion of the medium which is a fraction of the width of a single track and more than one transducer being magnetically coupled with each track;

means for detecting the lateral position of the information tracks relative to the fixed position of the transducers by monitoring the output signals from the transducers, the output of said detecting means being a lateral position signal;

means responsive to the lateral position signal for selecting the transducer or transducers most nearly aligned with each information track for information readout.

2. The apparatus of claim 1, wherein said transducers are magneto-optic devices responding to the interaction between the magnetic stored information and radiant energy.

3. The apparatus of Claim 1, where-in the guard band contains a cyclic signal of a first amplitude, and the information tracks contain a cyclic signal of a Second amplitude whereby said detecting means comprises:

means for rectifying the output from those transducers which are positioned adjacent an area where the guard band may reside depending upon lateral movement of the guard band and the information tracks, whereby the rectified output from transducers reading an information track will be a signal at a first level while the rectified output from transducers reading the guard band will be a signal at a second level;

logic means responsive to the levels of rectified output for determining the position of the guard band and generating a lateral position signal.

4. The apparatus of claim 1, where in said information tracks are recorded at a signal frequency, and said guard band is recorded at a guard band frequency, and wherein said detecting means comprises:

means for sensing the frequency of the signal from those transducers which are positioned adjacent an area where the guard band may reside depending upon lateral movement of the guard band and the information tracks, whereby said sensing means detects which transducers are reading the signal frequency and which transducers are reading the guard band frequency;

logic means responsive to said sensing means for logically determining the position of the guard band relative to the magnetic transducers and thereupon generating a lateral position signal.

5. The apparatus of Claim 1, wherein said detecting means comprises:

means for sensing the signal from those transducers which are positioned adjacent an area where the guard band may reside depending upon lateral movement of the guard band and information tracks, whereby said sensing means detects which transducers are positioned over information tracks and which transducers are positioned over the guard band;

means responsive to said sensing means for generating a lateral position signal indicative of the position of the guard band relative to the transducers;

said sensing means having a sensitivity deadband region so that changes in lateral position of the tracks must be significant before said generating means will generate a new lateral position signal.

6. Apparatus for electronically servoing transducers so that each information track on a magnetic storage medium is always read out by a transducer aligned with the track comprising:

a guide track on the storage medium;

information tracks recorded on the magnetic storage medium parallel to the guide track, each information track having a fixed position relative to said guide track;

an array of transducers fixedly mounted adjacent the storage medium for reading out the signals recorded on the storage medium; the width of each transducer being such that at least three transducers are required to completely span a single track, and the array of transducers together completely spans all possible lateral positions of the information tracks and guide track;

means responsive to said transducers for detecting whether each transducer is aligned with an information track or a guide track;

means responsive to said detecting means for generating a lateral position signal based upon the position of the guide track relative to said transducers as detected by said detecting means;

means responsive to the lateral position signal for selecting the transducer means presently aligned with and centered over each information track.

7. The apparatus of claim 6, wherein the guide track contains a cyclic signal of a first amplitude, and the information tracks contain a cyclic signal of a second amplitude whereby said detecting means comprises:

means for rectifying the output from each transducer, so that the rectified output from transducers reading an information track will be a signal at a first level while the rectified output from transducers reading the guide track will be a signal at a second level.

8. Apparatus of claim 6, wherein said information tracks are recorded at a signal frequency, and said guide track is recorded at a guide frequency, and wherein said detecting means comprises:

means for sensing the frequency of the signal from each transducer to detect which transducers are reading the signal frequency and which transducers are reading the guide frequency.

9. The apparatus of Claim 6, wherein said information tracks are recorded at a predetermined frequency and said guide track is recorded at the same frequency with a phase shift relative to the signal recorded on the information track, and wherein said detecting means comprises:

means for sensing the phase of the frequency signal from each transducer to detect which transducers are reading out a frequency signal from the information tracks and which transducers are reading out a frequency signal from the guide track.

10. The apparatus of claim 6, wherein said detecting means comprises:

means for sensing the signal from each transducer to detect which transducers are positioned over information tracks, and which transucers are positioned over the guide track, said sensing means having a sensitivity dead-band region so that changes in lateral position of the tracks must be significant before said generating means will generate a new lateral position signal.

11. Method for reading information in data tracks and at least one guide track on a storage medium with transducers for transducing the information from the tracks comprising the steps of:

transducing a plurality of tracks with a plurality of transducers wherein more than one transducer is aligned within the boundaries of each track and is transducing each track at any given time;

detecting the alignment between tracks on the medium and the transducers from the signals generated by the transducers by detecting which transducers are transducing the guide track;

using the signals generated by the transducers in a predetermined manner dependent upon the detected alignment between tracks and transducers.

12. Method of claim 11 wherein said using step comprises the step of selecting the signal generated by one transducer aligned with each track as determined by said detecting step.

13. Method of claim 11 wherein said using step comprises the steps of selecting at least one transducer aligned with each track as determined by said detecting step and inhibiting those transducers that overlap two adjacent tracks.

14. A method of claim 11 wherein said detecting step comprises the steps of:

monitoring the signals generated by the transducers for a guide signal from a guide track;

identifying those transducers that are generating the guide signals;

determining the boundary of the guide track from the position of those transducers identified as generating the guide signal, and thereby detecting the alignment between tracks and transducers.

15. Apparatus for decoding data signals from a mixture of guide and data signals generated by a plurality of transducers reading a guide track and data tracks on a magnetic storage medium comprising:

said plurality of transducers positioned so that more than one transducer is aligned within the boundaries of each track and is transducing each track at any given time;

a first group of said transducers positioned relative to an area of the medium where either the guide track or data tracks may reside;

means responsive to said first group of transducers for identifying those transducers transducing the guide track and thereby detecting the position of the guide track and generating an alignment signal;

means responsive to the alignment signal for separating out the data signal for each track from the mixture of guide and data signals generated by the plurality of transducers.

16. The apparatus of claim 15 wherein said identifying means comprises:

means for sensing the presence of a guide signal in the signal generated by each transducer of said first group;

a second means for sensing the presence of a data signal in the signal generated by each transducer of said first group;

means responsive to both of said sensing means for comparing signals from adjacent transducers in said first group to detect the boundary of the guide track from the presence of a guide signal from one transducer and the presence of a data signal from the adjacent transducer and thereby generate the alignment signal.

17. The apparatus of claim 15 wherein said separating means comprises;

means responsive to the alignment signal for gating the data signal for each track from the one transducer most nearly aligned with the track as the output data signal for that track.

18. The apparatus of claim 15 wherein said separating means comprises;

means responsive to the alignment signal for passing data signals for each track from all the transducers aligned completely within the boundaries of each data track;

means responsive to the alignment signal for inhibiting the passage of signals from transducers that overlap the boundary between adjacent data tracks.

* * * * *